United States Patent
Stockner et al.

(10) Patent No.: US 9,482,165 B2
(45) Date of Patent: Nov. 1, 2016

(54) DUAL FUEL COMMON RAIL DEPRESSURIZATION DURING ENGINE SHUTDOWN AND MACHINE USING SAME

(71) Applicant: Caterpillar, Inc., Peoria, IL (US)

(72) Inventors: Alan R. Stockner, Metamora, IL (US);
Nandagopal Methil, Dunlap, IL (US);
Daniel Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 671 days.

(21) Appl. No.: 13/866,110

(22) Filed: Apr. 19, 2013

(65) Prior Publication Data

US 2014/0316677 A1    Oct. 23, 2014

(51) Int. Cl.
*F02B 13/00*    (2006.01)
*F02D 41/00*    (2006.01)
(Continued)

(52) U.S. Cl.
CPC ......... *F02D 41/0025* (2013.01); *F02D 19/061* (2013.01); *F02D 19/0605* (2013.01); *F02D 19/0694* (2013.01); *F02D 19/10* (2013.01); *F02D 41/008* (2013.01); *F02D 41/0027* (2013.01); *F02D 41/042* (2013.01); *F02D 41/3094* (2013.01); *F02D 41/3863* (2013.01); *F02M 43/00* (2013.01); *F02M 63/026* (2013.01); *F02D 2200/0602* (2013.01); *F02M 55/002* (2013.01); *F02M 55/02* (2013.01); *F02M 63/0295* (2013.01); *Y02T 10/36* (2013.01)

(58) Field of Classification Search
CPC ............. F02D 2250/31; F02D 41/042; F02D 41/3836; F02D 2200/0602; F02D 41/3863; F02D 41/0025; F02D 41/008; F02D 41/3094; F02D 41/0027; F02D 19/0605; F02D 19/061; F02D 19/0694; F02D 19/10; F02M 43/00; F02M 63/026; F02M 63/0295; F02M 55/002; F02M 55/02; Y02T 10/36
See application file for complete search history.

(56) References Cited

U.S. PATENT DOCUMENTS

| | | | |
|---|---|---|---|
| 6,250,260 B1 * | 6/2001 | Green | F02B 3/06 123/27 GE |
| 7,637,252 B2 * | 12/2009 | Jung | F02M 37/0052 123/447 |
| 2005/0061297 A1 * | 3/2005 | Oono | F02D 33/006 123/458 |
| 2012/0285417 A1 * | 11/2012 | Kim | F02D 19/0684 123/299 |

FOREIGN PATENT DOCUMENTS

| | | |
|---|---|---|
| JP | 2001107784 | 4/2001 |
| KR | 1020090027810 | 3/2009 |

(Continued)

*Primary Examiner* — Sizo Vilakazi (57) ABSTRACT

A machine includes a compression ignition engine fueled from common rail fuel injectors that predominately inject natural gas fuel that is compression ignited with a small pilot injection of liquid diesel fuel. When an engine shutdown command is communicated to an electronic controller, the supply of gaseous fuel to the gas rail is stopped and the gaseous fuel common rail is depressurized by continuing to run the engine and inject gaseous and liquid fuels while commanding a liquid pressure greater than the gas pressure. After the gas rail pressure has achieved an acceptable shutdown pressure, the engine is stopped. The gas rail pressure is then reduced to atmospheric pressure followed by the liquid fuel common rail being reduced to atmosphere pressure after stopping the engine.

11 Claims, 7 Drawing Sheets

(51) Int. Cl.
*F02D 41/04* (2006.01)
*F02D 41/30* (2006.01)
*F02D 41/38* (2006.01)
*F02D 19/06* (2006.01)
*F02D 19/10* (2006.01)
*F02M 43/00* (2006.01)
*F02M 63/02* (2006.01)
*F02M 55/00* (2006.01)
*F02M 55/02* (2006.01)

(56) References Cited

FOREIGN PATENT DOCUMENTS

KR 1020090061375 6/2009
WO 2011120615 10/2011

* cited by examiner

DUAL FUEL COMMON RAIL DEPRESSURIZATION DURING ENGINE SHUTDOWN AND MACHINE USING SAME

TECHNICAL FIELD

The present disclosure relates generally to machines equipped with dual fuel compression ignition engines, and more particularly to a common rail depressurization strategy during engine shutdown.

BACKGROUND

Natural gas is increasingly becoming an attractive alternative for fueling internal combustion engines. In one specific example, a compression ignition engine is fueled predominately with natural gas originating from a gaseous fuel common rail, and liquid diesel fuel from a liquid fuel common rail that are directly injected into each engine cylinder. Both fuels are injected from the same fuel injector, and the relatively large charge of gaseous fuel is ignited by compression igniting a small pilot injection quantity of liquid diesel fuel. When both fuels are injected from a single fuel injector, there is a possibility of gaseous fuel migrating into the liquid side, and vice versa, which can lead to undermining proper operation of the fuel system. Co-owned U.S. Patent Application Publication No. 2012/0285417 shows an example of such a dual fuel system. During typical operation, the liquid fuel pressure is maintained greater than the gaseous fuel pressure to inhibit migration of gaseous fuel into the liquid fuel side of the fuel system. Pressure in the liquid fuel common rail can be changed quickly due to the relative incompressibility of the liquid fuel. However, changing pressure in the gaseous fuel common rail is far different due to the highly compressible nature of the gaseous fuel. Depressurizing the gaseous fuel common rail at shutdown without venting substantial amounts of gas to atmosphere can be difficult while maintaining a pressure differential that inhibits migration of gaseous fuel into the liquid fuel side of the fuel system.

The present disclosure is directed toward one or more of the problems set forth above.

SUMMARY

In one aspect, a method of shutting down an engine includes injecting gaseous fuel from a gaseous nozzle outlet set and liquid fuel from a liquid nozzle outlet set of a fuel injector directly into each of a plurality of engine cylinders. The injected liquid fuel is compression ignited in the respective engine cylinders. The injected gaseous fuel is ignited in the respective engine cylinder responsive to the compression ignition of the liquid fuel. An electronic controller executes an engine shutdown algorithm responsive to receiving communication of an engine shutdown command. Gas pressure in a gaseous fuel common rail is reduced below a shutdown pressure and liquid pressure in a liquid fuel common rail is commanded to be greater than the gas pressure, while running the engine, responsive to execution of the engine shutdown algorithm. Reducing gas pressure includes stopping a supply of gaseous fuel to the gaseous fuel common rail and thereafter injecting gaseous fuel into the engine cylinders. After the gas pressure has been reduced to the shutdown pressure, the engine is stopped responsive to execution of the engine shutdown algorithm. The liquid fuel common rail is reduced to atmospheric pressure after stopping the engine.

In another aspect, an engine includes an engine housing that defines a plurality of cylinders. A piston is positioned to reciprocate in each of the cylinders to define a compression ratio greater than 14:1. Exactly one fuel injector with a gaseous nozzle outlet set and a liquid nozzle outlet set is positioned for direct injection into each of the plurality of cylinders. A gaseous fuel common rail and liquid fuel common rail are fluidly connected to a first fuel inlet and a second fuel inlet, respectively, of each fuel injector. An electronic controller includes an engine shutdown algorithm configured to inject gaseous fuel into the engine cylinders to reduce gas pressure in the gaseous fuel common rail to below a shutdown pressure, and command liquid pressure in the liquid fuel common rail greater than the gas pressure, while running the engine, and then stopping the engine. Thereafter pressure in the liquid fuel common rail is reduced to atmospheric pressure.

In still another aspect, the engine may be supported on a machine body of a machine.

DETAILED DESCRIPTION

Figure 1:
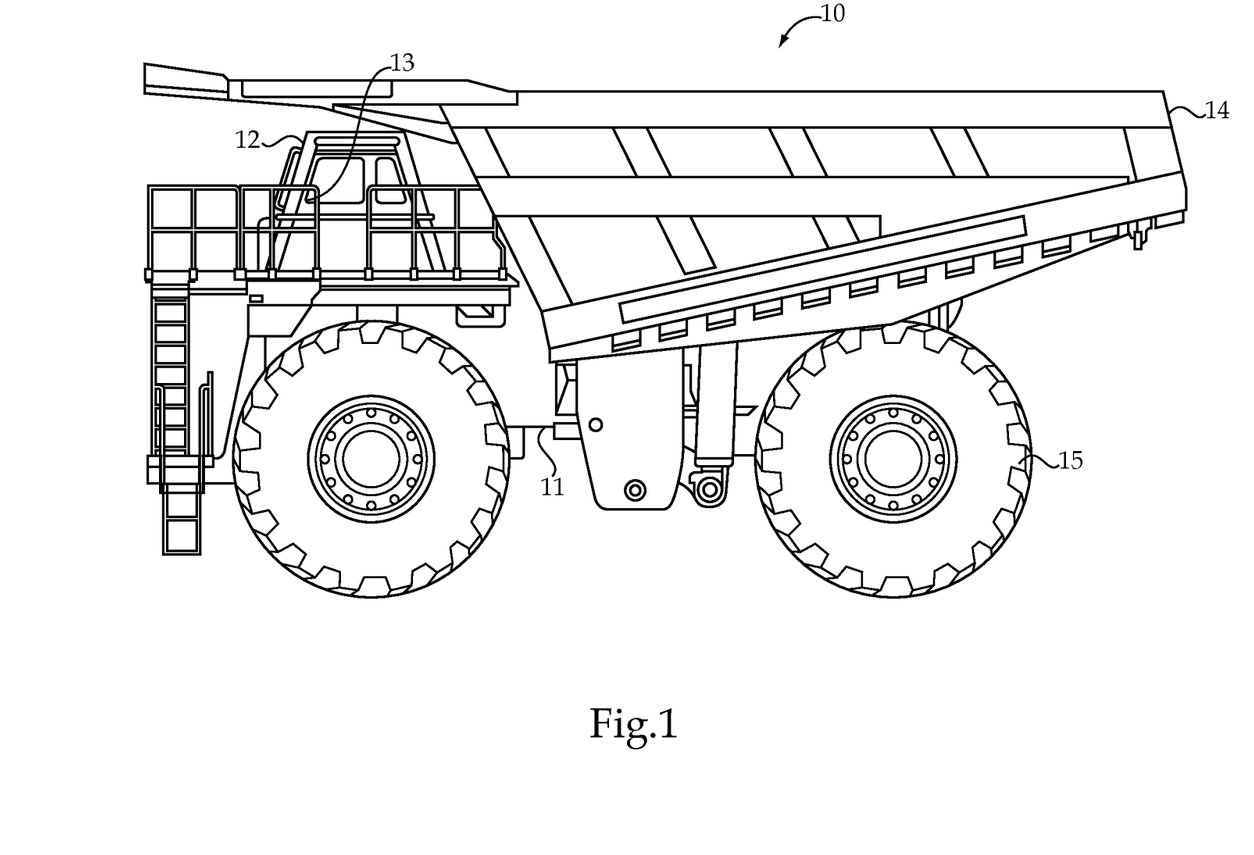
FIG. 1 is a side elevational view of a machine according to the present disclosure.

Referring initially to FIG. 1, a machine 10 includes a machine body 11 supported on a conveyance 15. In the illustrated embodiment, machine 10 is shown as a mining truck, and conveyance 15 is shown as wheels. Nevertheless, those skilled in the art will appreciate that a machine according to the present disclosure could take on a wide variety of forms including, but not limited to tracked vehicles and maybe even seagoing vessels. Machine 10 includes an operator station within which a conventional key switch 13 is located. Key switch 13 may be moved between key on and key off positions for operation of machine 10. In the illustrated embodiment, machine 10 also includes a dump body 14 that may be pivotable with respect to machine body 11 between a travel configuration, as shown, and a dump configuration in a manner well known in the art. According to the present disclosure, machine 10 is equipped with a compression ignition engine (see infra) that utilizes two different fuels. In particular, the dual fuel engine utilizes a small pilot injection quantity of liquid diesel fuel that is compression ignited to in turn ignite a much larger charge of gaseous fuel, such as natural gas.

Referring in addition to FIGS. 2-5, machine 10 is equipped with a dual fuel engine 20 that includes an engine housing 21 that defines a plurality of engine cylinders 22.

Although not visible in FIG. 1, engine 20 is supported on machine body 11 in a manner well known in the art. A piston 23 reciprocates in each of the cylinders 22 to define a compression ratio greater than 14:1, which is generally associated with a compression ratio suitable for compression igniting injected liquid diesel fuel. In the illustrated embodiment, engine 20 includes twenty engine cylinders 22. However, those skilled in the art will appreciate that an engine with any number of cylinders would also fall within the intended scope of the present disclosure. A dual fuel common rail system 29 includes exactly one fuel injector 30 positioned for direct injection into each of the plurality of engine cylinders 22. The dual fuel common rail system 29 includes a gaseous fuel common rail 40 and a liquid fuel common rail 41 that are fluidly connected to a gaseous fuel inlet 101 and a liquid fuel inlet 102, respectively, of each fuel injector 30. The dual fuel common rail system 29 includes gas supply of pressure control devices 43 that supply gaseous fuel to and control pressure in the gaseous fuel common rail 40. The gas supply and pressure control devices 43 may include a pressurized cryogenic liquid natural gas tank 31 with an outlet fluidly connected to a variable delivery cryogenic pump 36, and may also include a heat exchanger 32, an accumulator 33, a gas filter 34 and a fuel conditioning module 35 that controls the pressure of gaseous fuel in gaseous fuel common rail 40. Liquid supply and pressure control devices 44 may include a diesel fuel tank 37, fuel filters 38 and an electronically controlled high pressure fuel pump 39 that supplies liquid fuel to, and controls pressure in, liquid fuel common rail 41. A shutoff valve 45 may be located to isolate gaseous fuel common rail 40 from the supply portion of the gaseous fuel supply and pressure control devices 43, namely the accumulator 33 and cryogenic pump 36. An electronic controller 50 may be in control communication with shutdown valve 45, the liquid supply and pressure control devices 44, the gaseous supply and pressure control devices 43 as well as each of the fuel injectors 30.

Figure 5:
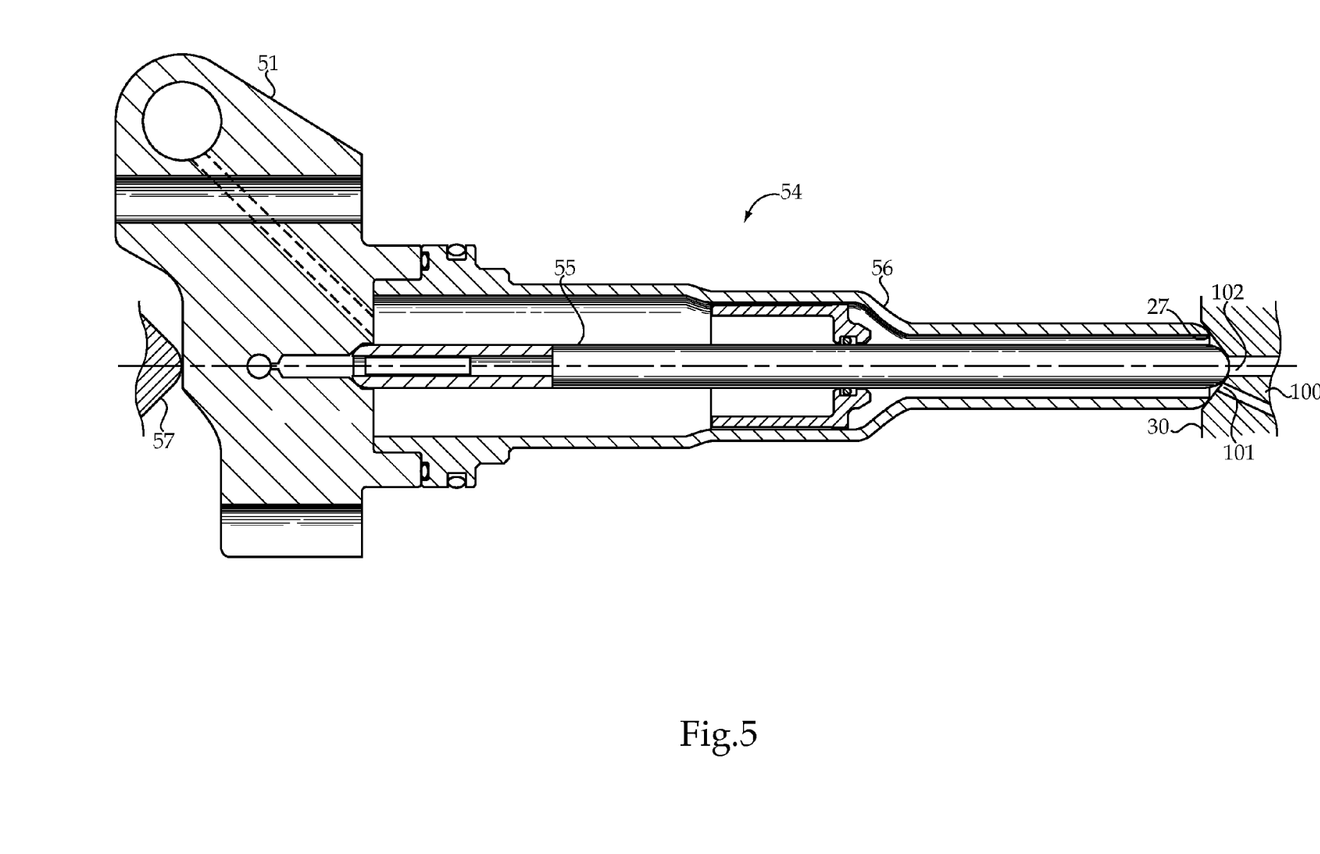
FIG. 5 is a sectioned side view of a concentric quill assembly for supplying gaseous and liquid fuels to individual fuel injectors.

Although not necessary, the gaseous fuel common rail 40 and the liquid fuel common rail 41 may be made up of a plurality of daisy chained blocks 51 that are connected in series with liquid fuel lines 52 and gaseous fuel lines 53. The liquid and gaseous fuels may be supplied to the individual fuel injectors 30 with a coaxial quill assembly 54 that includes an inner quill 55 that is positioned within an outer quill 56. Liquid fuel is supplied to the fuel injector 30 through inner quill 55, and gaseous fuel is supplied to fuel injector 30 in the space between inner quill 55 and outer quill 54. A load adjusting clamp 57 may be utilized with each block 51 for pushing the coaxial quill assembly 54 so that both the inner quill 55 and the outer quill 56 seat on a common conical seat 27 of each fuel injector 30.

Figures 6, 7:
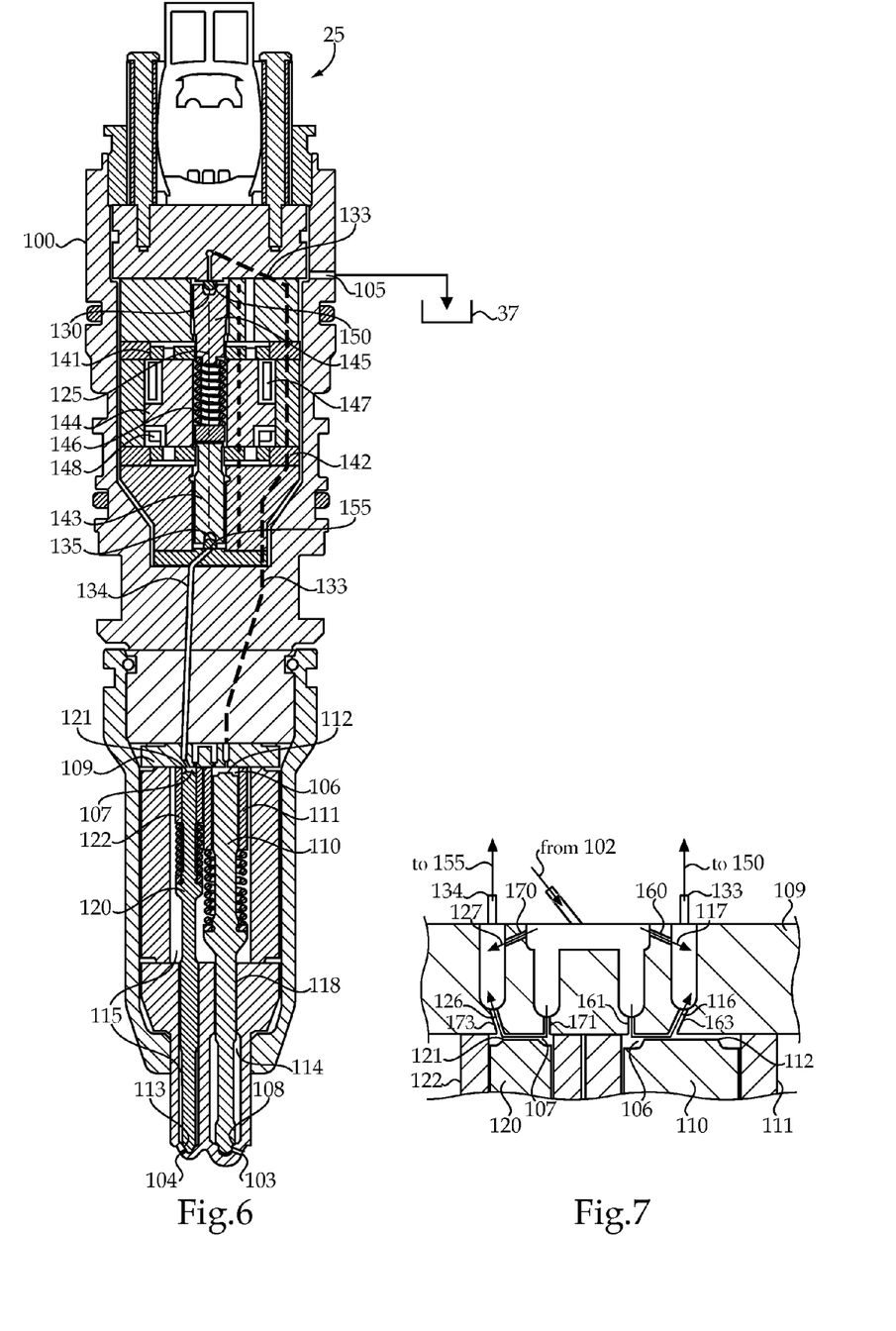
FIG. 6 is a front sectioned view of a fuel injector for the engine of FIGS. 2-5.
FIG. 7 is an enlarged front sectional view of a portion of the fuel injector of FIG. 6.

Referring in addition to FIG. 6, an example fuel injector 30 for use in the engine 20 is illustrated. Fuel injector 30 includes an injector body 100 that defines a gaseous fuel inlet 101 for gaseous fuel and a liquid fuel inlet 102 for liquid fuel that both open through common conical seat 27 (FIG. 5). The gaseous fuel inlet 101 is fluidly connected to a gaseous nozzle chamber 114 disposed within injector body 100 via a passageway not visible in the sectioned view of FIG. 6. Likewise, the liquid fuel inlet 102 is fluidly connected to a liquid nozzle chamber 115 via a passageway not visible in the sectioned view of FIG. 6. In the embodiment shown, the liquid nozzle chamber 115 is separated from the gaseous nozzle chamber 114 by a check guide area 118 associated with gaseous check valve member 110. Although other locations exist, such as where the coaxial quill 54 contacts the common conical seat 27 of injector body 100, migration of one fuel into the other fuel is possible in the guide clearance that exists in check guide area 118. As discussed in the background, migration of gaseous fuel from gaseous nozzle chamber 114 into liquid nozzle chamber 115 can be inhibited by maintaining the liquid fuel pressure in liquid fuel common rail 41 higher than the pressure in gaseous fuel common rail 40. For instance, at rated conditions, the liquid fuel rail 41 might be maintained about 40 MPa, whereas the gaseous fuel common rail might be maintained at about 35 MPa. Insignificant reversals of the desired pressure differentials can be tolerated in the scope of the present disclosure. As such, this pressure differential may inhibit gaseous fuel from migrating into the liquid fuel, but may permit a small amount of liquid fuel to migrate along guide area 118 from liquid nozzle chamber 115 to gaseous nozzle chamber 114. This small amount of leakage may be beneficial for lubricating both the check guide area 118 and the seat 108 associated with gaseous check valve member 110. At idle conditions, the target rail pressures may be substantial lower than at rated conditions.

Injector body 100 defines a gaseous nozzle outlet set 103, a liquid nozzle outlet set 104 and a drain outlet 105. Disposed within injector body 100 are a first control chamber 106 and a second control chamber 107. A gaseous check valve member 110 has a closing hydraulic surface 112 exposed to fluid pressure in the first control chamber 106. The gaseous check valve member 110 is movable between a closed position, as shown, in contact with a first nozzle seat 108 to fluidly block the gaseous fuel inlet 101 to the gaseous nozzle outlet set 103, and an open position out of contact with the first nozzle seat 108 to fluidly connect the gaseous fuel inlet 101 to the gaseous nozzle outlet set 103. First control chamber 106 may be partially defined by a first sleeve 111.

A liquid check valve member 120 has a closing hydraulic surface 121 exposed to fluid pressure in the second control chamber 107. The liquid check valve member 120 is movable between a closed position, as shown, in contact with a second nozzle seat 113 to fluidly block the liquid fuel inlet 102 to the liquid nozzle outlet set 104, and an open position out of contact with the second nozzle seat 113 to fluidly connect the liquid fuel inlet 102 to the liquid nozzle outlet set 104. The second control chamber 107 may be partially defined by a second sleeve 122. Thus, injection of gaseous fuel through gaseous nozzle outlet set 103 is facilitated by movement of gaseous check valve member 110, while injection of a liquid fuel through liquid nozzle outlet set 104 is facilitated by movement of the liquid check valve member 120. Those skilled in the art will appreciate that the first and second nozzle outlet sets 103, 104 might be expected to each include six nozzle outlets that are arranged around respective centerlines in a manner well known in the art. However, nozzle outlet sets 103 and 104 could each include as few as one nozzle outlet or any number of nozzle outlets in any arrangement without departing from the present disclosure.

A first control valve member 130 is positioned in injector body 100 and is movable along a common centerline 125 between a first position at which the first control chamber 106 is fluidly blocked to the drain outlet 105, and a second position at which the first control chamber 106 is fluidly connected to the drain outlet 105. When first control chamber 106 is fluidly connected to drain outlet 105, pressure in first control chamber 106 drops, relieving pressure on closing hydraulic surface 112 to allow gaseous check valve member 110 to lift to facilitate an injection of the gaseous fuel through gaseous nozzle outlet set 103. A second control valve member 135 is positioned in the injector body 100 and movable along the common centerline 125 between a first position at which the second control chamber 107 is fluidly blocked to the drain outlet 105, and a second position at which the second control chamber 107 is fluidly connected to the drain outlet 105. When second control chamber 107 is fluidly connected to drain outlet 105, fluid pressure acting on closing hydraulic surface 121 is relieved to allow liquid check valve member 120 to lift to an open position to facilitate injection of the liquid diesel fuel through the liquid nozzle outlet set 104.

In the illustrated embodiment, the first and second control valve members 130, 135 are intersected by the common centerline 125. The respective control valve members 130, 135 may be moved to one of their respective first and second positions with first and second electrical actuators that include first and second coils 147, 148, respectively. The control valve members 130, 135 may be biased to the their respective first positions by a shared biasing spring 146. A first armature 141 may be attached to a pusher 145 in contact with first control valve member 130. The first armature 141, the pusher 145 and the first control valve member 130 may be biased to the position shown in contact with first valve seat 150 which may be a flat seat, by shared biasing spring 146. Thus, first armature 141 can be thought of as being operably coupled to move the first control valve member 130. A second armature 142 may be operably coupled to move the second control valve member 135 by way of pusher 143. A shared stator 144 houses first and second coils 147, 148 and separates the first armature 141 from the second armature 142.

Referring now in addition to the enlarged view of FIG. 7, the first control valve member 130 is in contact and out of contact with a first valve seat 150 at the first position and the second position, respectively. Likewise, the second control valve member 135 is in contact and out of contact with a second valve seat 155 at its first position and second position, respectively. In the illustrated embodiment, at least one of the first valve seat 150 and second valve seat 155 may be a flat seat. However, one or the other may be a conical seat. When the upper coil 147 mounted in common stator 144 is energized, armature 141 and pusher 145 are moved downward allowing the high pressure in control passage 133 to push first control valve member 130 out of contact with first valve seat 150 to fluidly connect control chamber 106 to drain outlet 105. In the illustrated embodiment, the first control chamber 106 may always be fluidly connected to the high pressure in the liquid fuel inlet 102 via an F orifice 160 and a Z orifice 161. The upstream ends of respective F and Z orifices 160 and 161 may be fluidly connected to the liquid fuel inlet 102 via passages not visible in the sectioned views. The first control chamber 106 is fluidly connected to the control passage 133 via a so called A orifice 163. Thus, when first control valve member 130 lifts off of first valve seat 150, the second fuel inlet 102 becomes fluidly connected to the drain outlet 105 through a Z-A pathway 116 and an F pathway 117 that are fluidly in parallel with each other. The Z-A pathway 116 includes Z orifice 161, the first control chamber 106 and A orifice 163 in series, and the F pathway includes an F orifice 160. When open, the high pressure in liquid fuel inlet 102 will be directly fluidly connected to drain outlet 105 via both the Z orifice 161 and the F orifice 160. However after a brief delay, the connection to drain outlet 105 is sufficient to lower pressure in control chamber 106 to allow the gaseous check valve member 110 to lift and open to commence a gas injection event. When first control valve member 130 is moved upward to close first valve seat 150, the parallel fluid connections to high pressure liquid fuel inlet 102 facilitated by F orifice 160 and Z orifice 161 are closed to allow pressure to quickly build in control chamber 106 to abruptly end the gas injection event.

The second control chamber 107 may always be fluidly connected to the high pressure in liquid fuel inlet 102 via an F orifice 170 and a Z orifice 171. The upstream ends of respective F and Z orifices 170, 171 may be fluidly connected to the liquid fuel inlet 102 via passages not visible in the sectioned view. The second control chamber 107 is fluidly connected to the control passage 134 via a so-called A orifice 173. Thus, when the second control valve member 135 moves off of the second valve seat 155, the second fuel inlet 102 becomes fluidly connected to the drain outlet 105 through a Z-A pathway 126 and an F pathway 127 that are fluidly in parallel with each other. The Z-A pathway 126 includes Z orifice 171, the second control chamber 107 and the A orifice 163 in series, and the F pathway includes an F orifice 170. When open, the high pressure in liquid fuel inlet 102 will be directly fluidly connected to drain outlet 105 via both the Z orifice 171 and the F orifice 170. However, after a brief delay the connection to drain outlet 105 is sufficient to lower pressure in control chamber 107 to allow the liquid check valve member 120 to lift and open to commence a liquid injection event. When the second control valve member 135 is moved to close the second valve seat 155, the parallel fluid connections to high pressure second fuel inlet 102 facilitated by F orifice 170 and Z orifice 171 allow pressure to quickly build in control chamber 107 to abruptly end the liquid injection event.

Those skilled in the art will appreciate that the illustrated embodiment utilizes liquid diesel fuel to control movement of the gaseous check valve member 110 and the liquid check valve member 120 to facilitate control over gaseous fuel injection events and liquid diesel fuel injection events, respectively. Although readily apparent from FIG. 6, the first Z orifice 161, the first A orifice 163, the first F orifice 160, the second Z orifice 171, the second A orifice 163 and the second F orifice 171 may all have respective flow areas of a same order of magnitude. In other words, none of the orifices has a flow area more than ten times the flow area of any other one of the named orifices. Those skilled in the art will appreciate that injector body 100 may be constructed from a plurality of components arranged in an injector stack. In the illustrated embodiment, the injector stack includes an orifice disk 109. As best shown in FIG. 7, the first Z orifice 161, the first A orifice 163, the first F orifice 160, the second Z orifice 171, the second A orifice 173 and the second F orifice 170 may all be defined by orifice disk 109. This strategy may serve to locate all of these precision bored orifices in a single fuel injector component. Although not necessary, both the first control valve member 130 and the second control valve member 135, may be interchangeable identical components that may be made from a suitable ceramic material.

In the illustrated embodiment, the gaseous check valve member 110 and the liquid check valve member 120 are side by side and spaced apart. Nevertheless, those skilled in the art will appreciate that the structure could be different. For instance, dual concentric check valve members that were concentric with common centerlines would also fall within the scope of the present disclosure.

Each fuel injector 30 has an off configuration at which the liquid fuel inlet 102 is fluidly blocked to the drain outlet 105. Each fuel injector 30 has a gaseous injection configuration at which the liquid fuel inlet 102 is fluidly connected to the drain outlet 105 past the first control valve member 130.

Each fuel injector has a liquid injection configuration at which the liquid fuel inlet 102 is fluidly connected to the drain outlet 105 past the second control valve member 135. When one or the other of the control valve members 130 and 135 are actuated very briefly, fuel injector 30 can also be said to have a dry fire configuration at which the liquid fuel inlet 102 is fluidly connected to the drain outlet 105 without opening the respective liquid nozzle outlet set 104 or gaseous nozzle outlet set 103. Those skilled in the art will appreciate that the dry fire configuration is possible because there is a brief lag in time between when the control valves members 130 and 135 are opened and when the respective check valve 110 and 120 respond and move to their open positions. In other words, if the control valve is only opened briefly and then quickly reclosed, a small amount of liquid fuel can escape past the control valve member 130, 135 toward the drain outlet 105 without the respective check valve members 110, 120 moving to cause an injection event.

Figure 2:
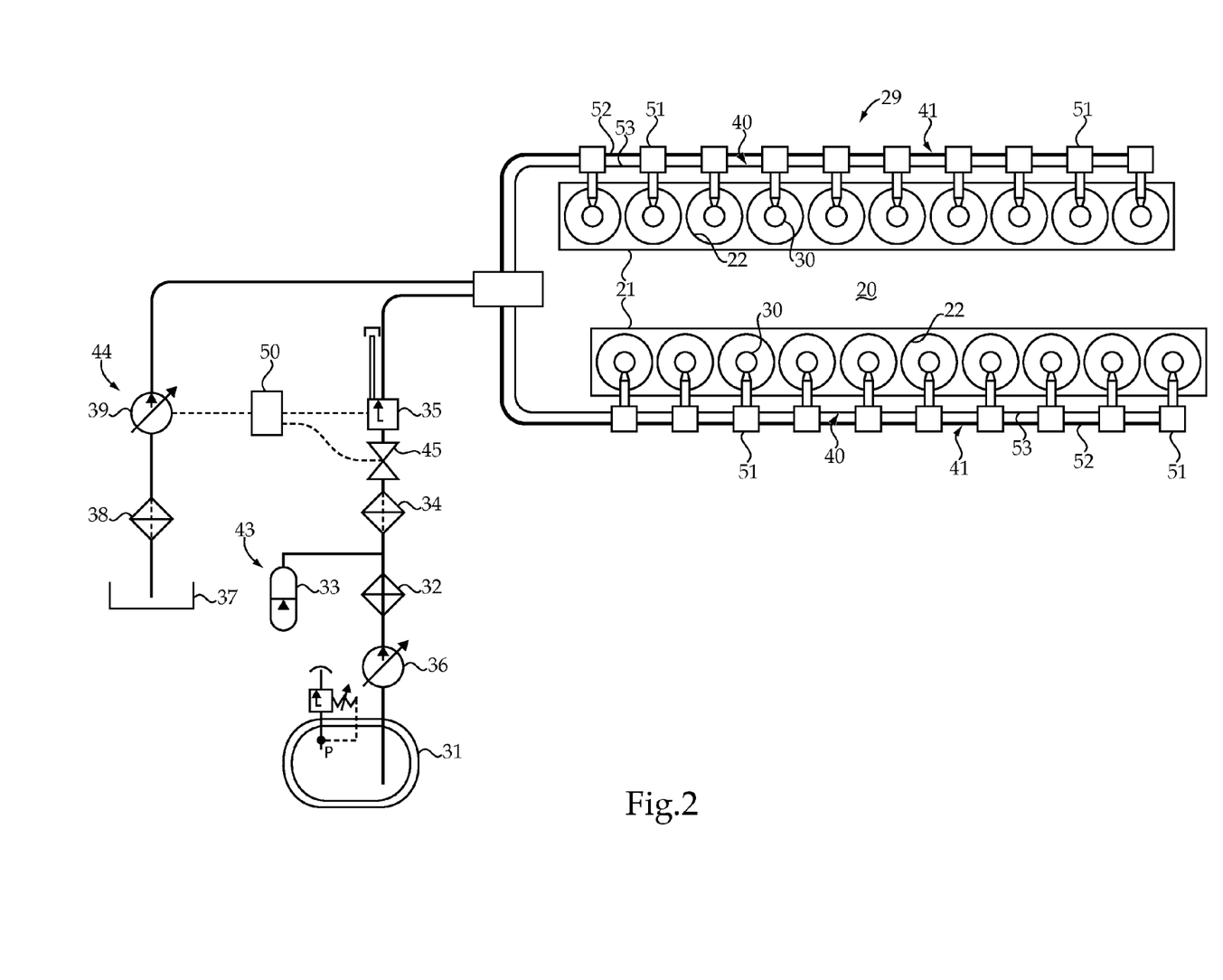
FIG. 2 is a schematic view of an engine according to another aspect of the present disclosure.
Figure 3:
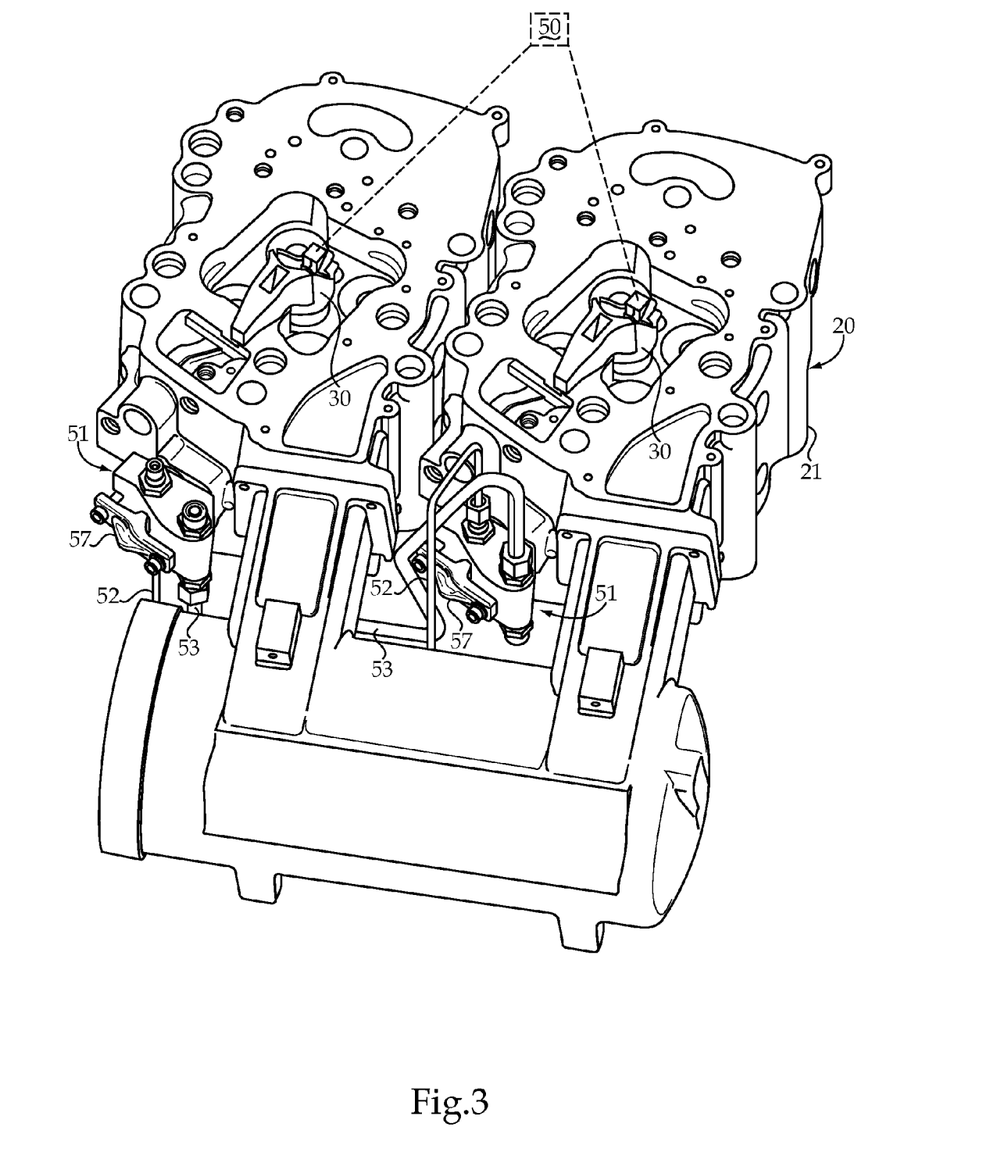
FIG. 3 is a perspective view of a portion of the engine shown in FIG. 2.
Figure 4:
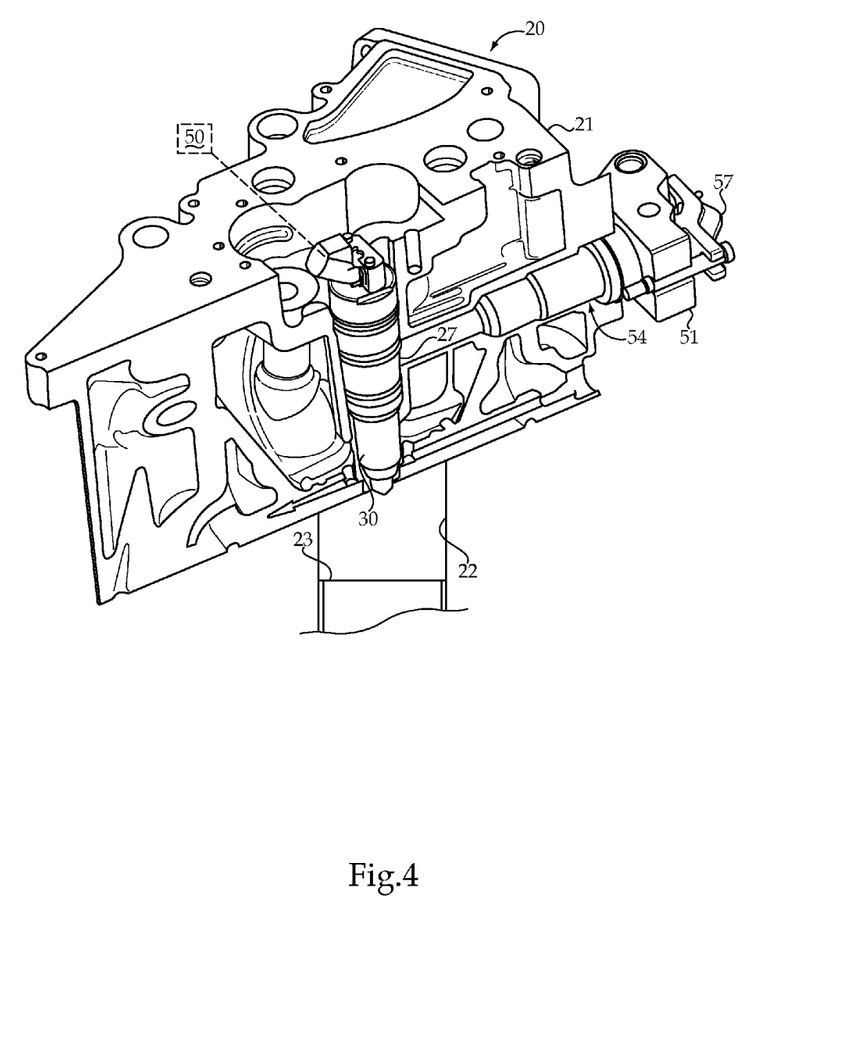
FIG. 4 is a sectioned perspective view through a portion of the engine shown in FIG. 3.

Apart from electronic controller 50 including various control algorithms for operating engine 20 in dual fuel modes at various speeds and loads, the present disclosure also teaches equipping the electronic controller with an engine shutdown algorithm configured to inject gaseous fuel into the engine cylinders 22 to reduce gas pressure in the gaseous fuel rail 40 to below a shutdown pressure, and command a liquid pressure in the liquid fuel common rail 41 greater than the gas pressure, while running the engine. After the gas pressure achieves the shutdown pressure, the execution of the engine shutdown algorithm will stop the engine. Thereafter, pressure in the liquid fuel common rail can be reduced to atmospheric pressure. One of the strategies associated with the engine shutdown algorithm is to reduce reliance upon venting natural gas to atmosphere as a strategy for reducing gas pressure in the gaseous fuel common rail 40. Instead, the present disclosure would teach a shutdown strategy that burns a majority of the remaining gas in the gaseous fuel common rail 40 before the engine is stopped.

INDUSTRIAL APPLICABILITY

The present disclosure applies broadly to any engine that utilizes two fluidly distinct common rails to deliver gaseous and liquid fuels to a single fuel injector associated with each engine cylinder. The present disclosure is specifically applicable to a strategy for depressurizing the common rails as part of an engine shutdown procedure. Finally, the present disclosure is directed to a shutdown depressurization strategy with reduced reliance on and possible elimination of, a need to vent natural gas to atmosphere in order to achieve depressurization.

Gaseous fuel is supplied from the gaseous fuel common rail 40 to each of the plurality of fuel injectors 30 by a respective co-axial quill assembly 54. Likewise, liquid fuel from a liquid fuel common rail 41 is supplied to each of the plurality of fuel injectors 30 by the same respective co-axial quill assemblies 54. When in operation, gaseous fuel is injected from each fuel injector 30 into an engine cylinder 22 responsive to a gaseous fuel injection signal communicated from electronic controller 50 to the fuel injector 30. In particular, a gaseous fuel injection event is initiated by energizing the upper electrical actuator (upper coil 147) to move armature 141 and first control valve member 130 downward out of contact with first valve seat 150. This fluidly connects control chamber 106 to drain outlet 105 to reduce pressure acting on closing hydraulic surface 112. The gaseous fuel check valve member 110 then lifts out of contact with first nozzle seat 108 to commence spray of gaseous fuel out of gaseous nozzle outlet set 103. The injection event is ended by de-energizing the upper electrical actuator to allow armature 141 and control valve member 130 to move upward under the action of spring 146 back into contact to close first valve seat 150. When this occurs, pressure abruptly rises in control chamber 106 acting on closing hydraulic surface 112 to push gaseous check valve member 110 back downward into contact with seat 108 to end the gaseous fuel injection event.

Also, liquid fuel from the fuel injector 30 is injected directly into engine cylinder 22 from the same fuel injector 30 responsive to a liquid fuel injection signal from electronic controller 50. In particular, a liquid fuel injection event is initiated by energizing the lower coil 148 to move armature 142 upward along common centerline 125. This causes pusher 143 to move second control valve member 135 out of contact with second valve seat 155. This in turn relieves pressure in control chamber 107 allowing liquid check valve member 120 to lift out of contact with second nozzle seat 113 to commence a liquid fuel injection event out of liquid nozzle outlet set 104. To end the liquid injection event, the lower electrical actuator (lower coil 148) is de-energized. When this is done, shared biasing spring 146 pushes armature 142 and second control valve member 135 back up into contact with second valve seat 155 to close the fluid connection between control chamber 107 and drain outlet 105. When this is done, pressure acting on closing hydraulic surface 121 quickly rises causing liquid check valve member 120 to move downward and back into contact with second nozzle seat 113 to end the liquid fuel injection event. Both liquid and natural gas injection events are ended by fluidly connecting the respective control chambers 107, 106 to the liquid fuel common rail 22 through respective F orifices 160, 170, and Z orifices 161, 171 that are fluidly in parallel.

Because of its high compression ratio (greater than 14:1) the injected liquid fuel will compression ignite in each of the respective engine cylinders 22. The injected gaseous fuel is ignited in a respective one of the engine cylinders responsive to the compression ignition of the liquid fuel. At some point during the operation of machine 10 and engine 20, an engine shutdown command will be communicated to electronic controller 50, such as by moving key switch 13 from an on position to a key off position. Electronic controller 50 may be configured to execute an engine shutdown algorithm responsive to the engine shutdown command. Proper execution of the engine shutdown algorithm reduces gas pressure in the gaseous fuel common rail below a shutdown pressure in order to reduce, and possibly eliminate, a need to vent gaseous fuel from the gaseous fuel common rail 40 to atmosphere at the time of shutdown. In order to accomplish this goal, the engine 20 remains running when the engine shutdown algorithm is initiated and depressurization of the gaseous fuel common rail 40 is facilitated by injecting and burning the gaseous fuel in response to compression igniting a small liquid diesel injection. As such, and in order to inhibit migration of gaseous fuel into the liquid rail, the liquid pressure in the liquid fuel common rail 41 is commanded to be maintained greater than the gas pressure in the gaseous fuel common rail 40. In addition, the reduction of gas pressure is facilitated by stopping a supply of gaseous fuel to the gaseous fuel common rail 40 by closing the shut off valve 45 responsive to execution of the engine shutdown algorithm. There may be limits to how far the gas pressure in the gaseous fuel common rail 40 can be reduced prior to stopping the engine via gaseous fuel injection events due to at least two considerations. First, gas can only be injected into the cylinder 22 when the cylinder pressure is less than the gas pressure. Secondly, injected gas can go potentially unburned when the mixture of gaseous fuel and air in the cylinder is so lean that the ignition of a pilot quantity of liquid diesel fuel is insufficient to burn all of the gaseous fuel in the cylinder 22. Thus, it may not be practical to both inject and burn gaseous fuel below some predetermined shutdown pressure before stopping the engine. In other words, the risk of a gaseous slip event may become unacceptably high when attempting to inject gaseous fuel at any timings below the predetermined shutdown pressure. Nevertheless, tests and simulations suggest that on the order of 90% of the gaseous fuel in the gaseous fuel common rail 40 can be effectively injected and burned during execution of the engine shutdown algorithm, leaving maybe 10% of the preshutdown gas in the gaseous fuel common rail 40 below a predetermined shutdown pressure, which is still greater than atmospheric pressure. Thus, after the gas pressure in the gaseous fuel common rail is reduced below a shutdown pressure, the engine may be stopped. After the engine is stopped, the remaining gas in the gaseous fuel common rail may be processed in a number of ways in order to return the gaseous fuel common rail 40 to atmospheric pressure. For instance, the remaining gaseous fuel may be channeled to an absorber, be channeled back to the gaseous fuel supply system, be burned in the exhaust stack or elsewhere, or the remaining gas in the gaseous fuel common rail 40 may be offloaded. As a least desirable option this last small amount of gas may be vented to atmosphere in order to complete the depressurization. After the depressurization of the gaseous fuel rail 40, the liquid fuel common rail 41 may have its pressure reduced to atmospheric pressure to complete the engine shutdown procedure.

After initiating the engine shutdown algorithm, but before stopping the engine while both liquid and gaseous fuels are being injected and burned, it may be necessary to alter gaseous fuel injection timings, especially when the shutdown pressure is less than a top dead center (TDC) cylinder pressure. Those skilled in the art will appreciate that TDC cylinder pressure corresponds to the cylinder pressure when the engine piston 23 is at top dead center prior to a combustion event, and is primarily determined by engine geometry, compression ratio and how the engine is being then operated (e.g., boost pressure, etc.). During normal operation, both the liquid and gaseous injection events will often occur in the vicinity of top dead center. However, as the gas pressure is reduced and begins to approach the TDC cylinder pressure, the gaseous fuel injection events may be performed at timings when the cylinder pressure is less than the TDC cylinder pressure in order to maintain an adequate pressure differential between the gas pressure in gaseous fuel common rail 40 and the pressure in the cylinder 22 to facilitate an effective and substantial gaseous injection event in the time available. In one specific example, the timings of the gaseous injection events may be advanced to angles smaller than a gaseous slip timing threshold. A gaseous slip timing threshold corresponds to when the mixture of gaseous fuel and air in the cylinder become so lean as to allow for a substantial portion of the gaseous fuel to go unburned and escape in a slip event. For instance, a gaseous slip timing threshold might be on the order of about 30 degrees before top dead center. Thus, gaseous fuel injection events may not be advanced beyond that threshold because the risk of a gaseous slip event becomes unacceptably high. The present disclosure also teaches that a higher ratio of gaseous fuel to liquid fuel may be injected in a given engine cycle by utilizing a cylinder cutout strategy in which the gaseous fuel and liquid fuel are injected in less than all of the engine cylinders 22 in an engine cycle. For instance, if engine 20 is being operated in an idle condition during the shutdown procedure, proportionally more gaseous fuel may be injected and burned if maybe only half the cylinders are active. If this option is utilized, the electronic controller 50 may cycle through different combinations of active and inactive cylinders 22 in each engine cycle for reasons well known in the art.

In those cases, as in the illustrated embodiment where liquid fuel is utilized as a control fluid as well as an injection fluid, some liquid fuel is moved out of the drain outlet 105 during each gaseous fuel injection event and each liquid fuel injection event for each respective fuel injector. In addition, some small amount of liquid fuel is moved out of the drain outlet 105 incrementally reducing pressure in the liquid fuel common rail 41 not only responsive to injection events, but also when the fuel injector 30 is placed in a dry fire configuration. Thus, the present disclosure also teaches that after the engine 20 is stopped and the gaseous rail pressure depressurization operation has been completed, the liquid fuel common rail may be depressurized by performing a sufficient number of dry fire events that a sufficient amount of liquid fuel is moved to drain outlet 105 to depressurize the liquid fuel common rail 41 to atmospheric pressure. Such a strategy may be especially important in those cases that utilize so called zero leak control valves. Nevertheless, many fuel injection systems might allow for natural decay of pressure in the liquid fuel common rail 41 by simply exploiting the tendency and expected presence of small leaks to naturally depressurize the liquid fuel common rail in a matter of seconds or minutes after engine shutdown.

Figure 8:
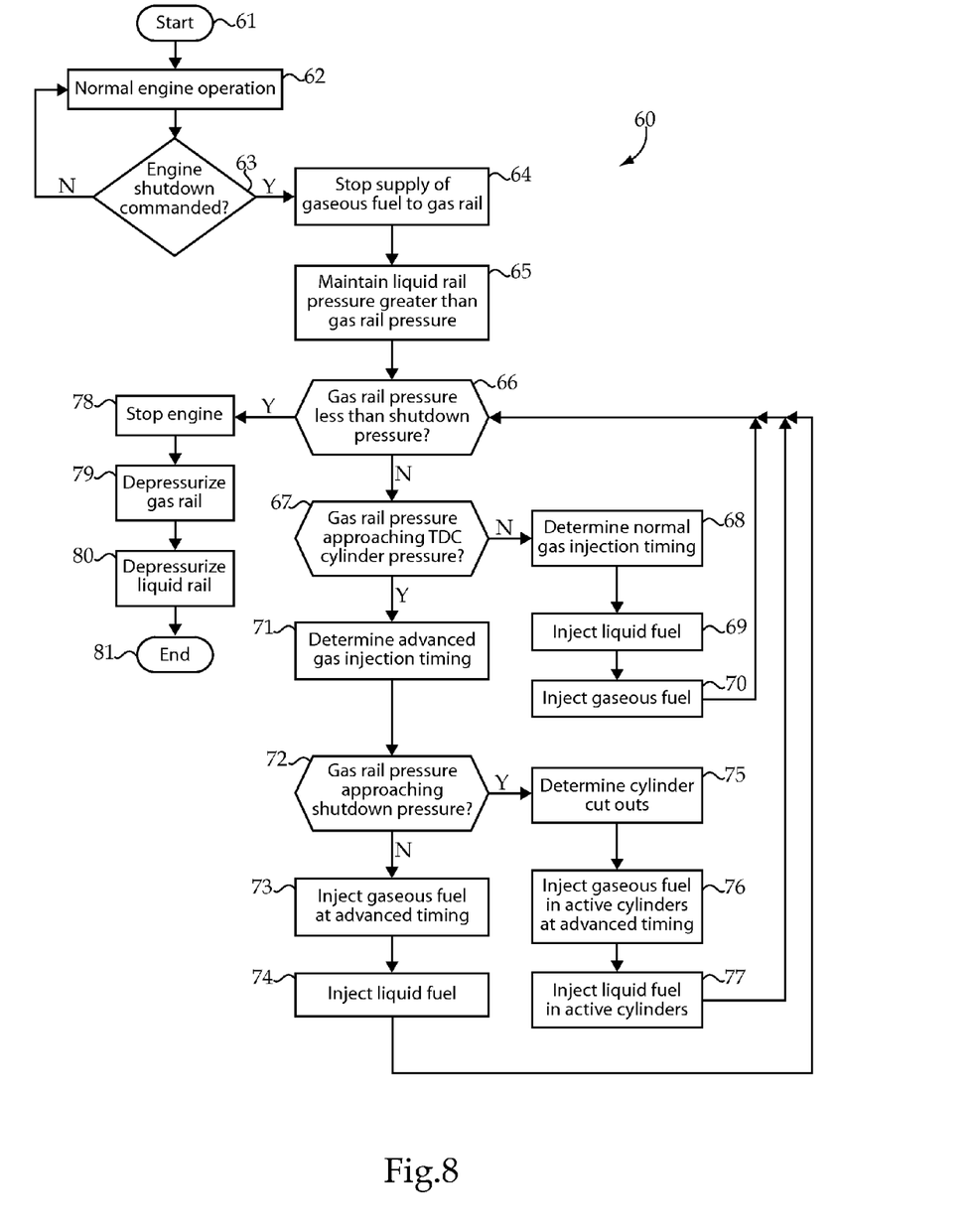
FIG. 8 is a logic flow diagram of an engine shut down algorithm according to another aspect of the present disclosure.

Referring now to FIG. 8, the logic associated with an engine shutdown algorithm 60 according to one aspect of the present disclosure is illustrated. After start oval 61, block 62 is associated with the engine 20 undergoing normal operation that includes injecting liquid fuel for compression ignition to in turn ignite a larger charge of gaseous fuel as previously described. At query 63, the algorithm 60 determines whether an engine shutdown command has been communicated, such as by an operator moving a key switch to a manual off position. If no engine shutdown is commanded, the logic loops back and continues normal engine operations at block 62. However, if an engine shutdown command is communicated, the logic advances to block 64 where the supply of gaseous fuel to the gaseous fuel rail 40 is stopped. This step may include closing shutoff valve 45 (see FIG. 2). Next at block 65, the liquid rail pressure is commanded to be maintained greater than the gas rail pressure throughout execution of the engine shutdown algorithm 60. Next, at query 66, it is determined whether the gas rail pressure has dropped lower than a predetermined shutdown pressure. If not, the logic advances to query 67 to determine whether the gas rail pressure is approaching a TDC cylinder pressure. If not, the logic advances to block 68 to determine normal gas and liquid injection timings. These normal timings may include injecting the pilot quantity of liquid diesel fuel at or around top dead center, and commencing a gaseous fuel injection event during or shortly after the liquid injection event in order to facilitate a diffusion burn strategy. At block 69, the liquid fuel is injected, and at block 70 the gaseous fuel is injected. Thereafter, the logic returns back to query 66 to determine whether the gas rail pressure has been reduced lower than the shutdown pressure. If not, the logic again moves to query 67 in order to determine whether the gas rail pressure is approaching the TDC cylinder pressure. If so, the logic advances to block 71 to determine advanced gas injection timings so that the gas injection event occurs when the gas rail pressure is substantially greater than the cylinder pressure at the time of the injection event. Next, at query 72, the logic determines whether the gas rail pressure is approaching the shutdown pressure. If not, the gaseous fuel is injected at an advanced timing at block 73 followed by the liquid fuel being injected at block 74. Thereafter, the logic loops back again to query 66. As the logic again executes query 66, 67 and 72, the gas rail pressure will eventually approach the shutdown pressure and the logic may then move to block 75 to further drive down gas rail pressure through a cylinder cutout strategy. Next, at block 76 gaseous fuel is injected into the active cylinders at the advanced timings determined in block 71. At block 77, liquid fuel is injected in the active of cylinders. The logic then loops back again to query 66.

Eventually query 66 will return a positive answer indicating that the gas rail pressure has finally been depressurized lower than a predetermined shutdown pressure. Next, the logic will advance to block 78 and stop the engine. At block 79, the remaining small amount (maybe 10%) of the gas in the gaseous fuel common rail 40 which is now below shutdown pressure is depressurized down to atmospheric pressure by some appropriate means, such as channeling the remaining gas to an external burner outside the engine, channeling the gas to an absorber for later extraction after the engine is restarted, offloading the gas, returning the remaining gas to the gaseous fuel supply system or some other strategy known in the art. Preferably, the gas rail depressurization is completed without venting gaseous fuel to atmosphere, but the present disclosure does not rule out venting some gaseous fuel to atmosphere. After the gaseous rail 40 has been depressurized to atmospheric pressure, the liquid fuel rail may be depressurized at block 80 either through natural decay because of small leaks in the fuel system, or by utilizing the fuel injector dry fire configuration discussed earlier if the fuel injectors are so called zero leak fuel injectors. Next, at oval 18 the engine shutdown algorithm ends and the electronic controller 50 may now be ready to power down. By utilizing the engine shutdown strategy of the present disclosure, the gas rail can be depressurized with little to no venting or slippage of gaseous fuel to atmosphere.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine comprising:
   an engine housing that defines a plurality of cylinders;
   a piston positioned to reciprocate in each cylinder of the plurality of cylinders to define a compression ratio greater than 14:1;
   a plurality of fuel injectors, each fuel injector of the plurality of fuel injectors including a gaseous nozzle outlet set and a liquid nozzle outlet set positioned for direct injection into a corresponding cylinder of the plurality of cylinders;
   a gaseous fuel common rail and a liquid fuel common rail fluidly connected to a first fuel inlet and a second fuel inlet, respectively, of each fuel injector; and
   an electronic controller operatively coupled to each fuel injector, the electronic controller being configured to
   receive a signal indicative of a gaseous fuel pressure within the gaseous fuel common rail,
   receive an engine shutdown command signal, and close a gaseous fuel shutdown valve in response to the engine shutdown command signal, the gaseous fuel shutdown valve being disposed upstream of the plurality of fuel injectors, and
   continue running the engine after the engine shutdown command signal according to an engine shutdown algorithm, the engine shutdown algorithm including
      maintaining a liquid fuel pressure in the liquid fuel common rail greater than the gaseous fuel pressure in the gaseous fuel common rail,
      injecting gaseous fuel into at least one cylinder of the plurality of cylinders to reduce the gaseous fuel pressure in the gaseous fuel common rail to below a threshold shutdown pressure, and
      stopping the engine after the gaseous fuel pressure is reduced below the threshold shutdown pressure.

2. A machine comprising:
   a machine body;
   an engine supported on the machine body and including an engine housing that defines a plurality of cylinders;
   a piston positioned to reciprocate in each cylinder of the plurality cylinders to define a compression ratio greater than 14:1;
   a plurality of fuel injectors, each fuel injector of the plurality of fuel injectors including a gaseous nozzle outlet set and a liquid nozzle outlet set positioned for direct injection into a corresponding cylinder of the plurality of cylinders;
   a gaseous fuel common rail and a liquid fuel common rail fluidly connected to a first fuel inlet and a second fuel inlet, respectively, of each fuel injector; and
   an electronic controller operatively coupled to each fuel injector, the electronic controller being configured to
   receive a signal indicative of a gaseous fuel pressure within the gaseous fuel common rail,
   receive an engine shutdown command signal, and close a gaseous fuel shutdown valve in response to the engine shutdown command signal, the gaseous fuel shutdown valve being disposed upstream of the plurality of fuel injectors, and
   continue running the engine after the engine shutdown command signal according to an engine shutdown algorithm, the engine shutdown algorithm including
      maintaining a liquid fuel pressure in the liquid fuel common rail greater than the gaseous fuel pressure in the gaseous fuel common rail,
      injecting gaseous fuel into the plurality of cylinders at a normal gas injection timing responsive to the gaseous fuel pressure being greater than a first threshold pressure, the first threshold pressure being greater than a top dead center (TDC) cylinder pressure,
      injecting gaseous fuel into the plurality of cylinders at an advanced injection timing responsive to the gaseous fuel pressure being less than the first threshold pressure and greater than a second threshold pressure, the advanced injection timing being earlier than the normal gas injection timing and earlier than a top dead center timing of a corresponding piston on a compression stroke, the second threshold pressure being less than the TDC cylinder pressure and greater than a shutdown threshold pressure,
      operating the engine according to a cylinder cut out mode responsive to the gaseous fuel pressure being less than the second threshold pressure and greater than the shutdown threshold pressure, such that inactive cylinders of the plurality of cylinders do not receive gaseous fuel during a cycle of the engine, and active cylinders of the plurality of cylinders receive gaseous fuel during the cycle of the engine, stopping the engine when the gaseous fuel pressure is less than the shutdown threshold pressure, and reducing the liquid fuel pressure in the liquid fuel common rail to less than the threshold shutdown pressure after the gaseous fuel pressure is reduced below the threshold shutdown pressure.

3. The machine of claim 2 wherein the engine shutdown command is communicated to the electronic controller responsive to a key off position in an operator station.

4. The engine of claim 1, wherein the engine shutdown algorithm further includes injecting gaseous fuel into the plurality of cylinders at a normal gas injection timing responsive to the gaseous fuel pressure being greater than a first threshold pressure, the first threshold pressure being greater than a top dead center (TDC) cylinder pressure, and the TDC cylinder pressure being greater than the threshold shutdown pressure.

5. The engine of claim 4, wherein the engine shutdown algorithm further includes injecting gaseous fuel into the plurality of cylinders at an advanced injection timing responsive to the gaseous fuel pressure being less than the first threshold pressure and greater than a second threshold pressure, the advanced injection timing being earlier than the normal gas injection timing and earlier than a top dead center timing of a corresponding piston on a compression stroke, the second threshold pressure being less than the TDC cylinder pressure and greater than the threshold shutdown pressure.

6. The engine of claim 5, wherein the engine shutdown algorithm further includes operating the engine according to a cylinder cut out mode responsive to the gaseous fuel pressure being less than the second threshold pressure and greater than the threshold shutdown pressure, such that inactive cylinders of the plurality of cylinders do not receive gaseous fuel during a cycle of the engine, and active cylinders of the plurality of cylinders receive gaseous fuel during the cycle of the engine.

7. The engine of claim 4 wherein the engine shutdown algorithm further includes operating the engine according to a cylinder cut out mode responsive to the gaseous fuel pressure being less than a second threshold pressure and greater than the threshold shutdown pressure, such that inactive cylinders of the plurality of cylinders do not receive gaseous fuel during a cycle of the engine, and active cylinders of the plurality of cylinders receive gaseous fuel during the cycle of the engine, the second threshold pressure being less than the TDC cylinder pressure and greater than the threshold shutdown pressure.

8. The engine of claim 1 wherein the engine shutdown algorithm further includes injecting gaseous fuel into the plurality of cylinders at an advanced injection timing responsive to the gaseous fuel pressure being less than a first threshold pressure and greater than a second threshold pressure, the advanced injection timing being earlier than a top dead center timing of a corresponding piston on a compression stroke, the first threshold pressure being greater than a top dead center (TDC) cylinder pressure, the second threshold pressure being less than the TDC cylinder pressure and greater than the threshold shutdown pressure.

9. The engine of claim 8 wherein the engine shutdown algorithm further includes operating the engine according to a cylinder cut out mode responsive to the gaseous fuel pressure being less than the second threshold pressure and greater than the threshold shutdown pressure, such that inactive cylinders of the plurality of cylinders do not receive gaseous fuel during a cycle of the engine, and active cylinders of the plurality of cylinders receive gaseous fuel during the cycle of the engine.

10. The engine of claim 1, wherein the engine shutdown algorithm further includes operating the engine according to a cylinder cut out mode responsive to the gaseous fuel pressure being less than a second threshold pressure and greater than the threshold shutdown pressure, such that inactive cylinders of the plurality of cylinders do not receive gaseous fuel during a cycle of the engine, and active cylinders of the plurality of cylinders receive gaseous fuel during the cycle of the engine, the second threshold pressure being less than a top dead center (TDC) cylinder pressure.

11. The engine of claim 1, wherein the engine shutdown algorithm further includes reducing the liquid fuel pressure in the liquid fuel common rail to less than the threshold shutdown pressure after the gaseous fuel pressure is reduced below the threshold shutdown pressure.

* * * * *